(12) United States Patent
Licht et al.

(10) Patent No.: US 8,137,422 B2
(45) Date of Patent: Mar. 20, 2012

(54) STEAM-HYDROCARBON REFORMING WITH REDUCED CARBON DIOXIDE EMISSIONS

(75) Inventors: William Robert Licht, Allentown, PA (US); Stephen Paul DiMartino, Sr., Schnecksville, PA (US); Eugene S. Genkin, Allentown, PA (US); Xianming Jimmy Li, Orefield, PA (US); Bryan Clair Hoke, Jr., Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 394 days.

(21) Appl. No.: 12/477,617

(22) Filed: Jun. 3, 2009

(65) Prior Publication Data

US 2010/0310949 A1 Dec. 9, 2010

(51) Int. Cl.
*C01B 3/34* (2006.01)
*C10J 3/46* (2006.01)

(52) U.S. Cl. ............... 48/197 R; 48/198.1; 48/198.3; 423/650; 423/651; 423/652; 423/655; 252/373

(58) Field of Classification Search ............ 48/197 R, 48/198.1, 198.3; 423/650, 651, 652, 655; 252/373
See application file for complete search history.

(56) References Cited

U.S. PATENT DOCUMENTS

| | | | |
|---|---|---|---|
| 3,479,298 A | 11/1969 | Sze et al. | |
| 3,515,527 A | 6/1970 | Cockerham et al. | |
| 3,882,636 A | 5/1975 | Horie et al. | |
| 3,988,425 A | 10/1976 | Jockel et al. | |
| 4,105,591 A | 8/1978 | Banks et al. | |
| 4,340,501 A | 7/1982 | Davidson | |
| 5,202,057 A | 4/1993 | Nicholas et al. | |
| 6,328,945 B1 | 12/2001 | Hufton et al. | |
| 6,981,994 B2 | 1/2006 | Drnevich et al. | |
| 8,002,854 B2 * | 8/2011 | Muradov | 48/61 |
| 2006/0171878 A1 | 8/2006 | Blumenfeld et al. | |
| 2010/0080754 A1 | 4/2010 | Fischer et al. | |
| 2010/0158776 A1 | 6/2010 | Drnevich et al. | |

FOREIGN PATENT DOCUMENTS

| | | |
|---|---|---|
| EP | 1 582 502 A1 | 10/2005 |
| EP | 2 168 913 A1 | 3/2010 |
| GB | 969637 | 9/1964 |

(Continued)

OTHER PUBLICATIONS

Giacobbe, F. G., et al., "Increase Hydrogen Production", Petrochemical/Chemical Developments, Hydrocarbon Processing, Mar. 1992, pp. 69-72.

(Continued)

*Primary Examiner* — Timothy Vanoy
(74) *Attorney, Agent, or Firm* — Bryan C. Hoke, Jr.

(57) ABSTRACT

A process for producing a hydrogen-containing product gas with reduced carbon dioxide emissions compared to conventional hydrogen production processes. A hydrocarbon and steam are reformed in a reformer and the resulting reformate stream is shifted in one or more shift reactors. The shifted mixture is scrubbed to remove carbon dioxide to form a carbon dioxide-depleted stream. The carbon dioxide-depleted stream is separated to form a hydrogen-containing product gas and a by-product gas. A portion of the hydrogen containing product gas is used as a fuel in the reformer and a portion of the by-product gas is recycled back into the process. The process may optionally include reforming in a pre-reformer and/or an oxygen secondary reformer.

12 Claims, 4 Drawing Sheets

FOREIGN PATENT DOCUMENTS

| | | |
|---|---|---|
| GB | 1 129 597 | 10/1968 |
| GB | 1150066 | 4/1969 |
| GB | 1155843 | 6/1969 |
| WO | 2005/012166 A1 | 2/2005 |
| WO | 2010/018550 A1 | 2/2010 |

OTHER PUBLICATIONS

Tindall, B. M., et al., "Alternative Technologies to Steam-Methane Reforming", Refining Developments, Hydrocarbon Processing, Nov. 1995, pp. 75-81.

* cited by examiner

STEAM-HYDROCARBON REFORMING WITH REDUCED CARBON DIOXIDE EMISSIONS

BACKGROUND

There is growing pressure to reduce carbon dioxide emissions from industrial processes. A large hydrogen production plant may produce up to 900,000 metric tons of carbon dioxide per year, thus it may be considered a significant source of carbon dioxide.

In Europe, Canada, and California, carbon dioxide reduction regulations are being phased in gradually. This means that greenhouse gas (GHG) legislation remains a key consideration in projects in the 2012-2015 timeframe. The current understanding on this issue is that new plants will have to plan for carbon dioxide capture but may not be required to install and operate such systems at the project on-stream date. Therefore, industry desires a flexible carbon dioxide capture ready design that may be implemented when needed.

Industry desires to produce hydrogen by steam-hydrocarbon reforming while capturing carbon dioxide thereby decreasing or eliminating carbon dioxide emissions.

Industry desires to adjust the amount of carbon dioxide capture based on regulations and economics.

Industry desires an energy efficient large-scale hydrogen production process with decreased carbon dioxide emissions compared to conventional processes.

BRIEF SUMMARY

The present invention relates to a process for producing a hydrogen-containing product gas. The process comprises:
(a) introducing a process stream comprising steam and at least one hydrocarbon selected from the group consisting of methane, ethane, propane, butane, pentane, and hexane into a plurality of catalyst-containing reformer tubes in a reformer furnace and reacting the process stream inside the plurality of catalyst-containing reformer tubes at a first temperature ranging from 700° C. to 1000° C. and a first pressure ranging from 2 to 50 atmospheres to form a reformate stream comprising hydrogen, carbon monoxide, methane and steam and withdrawing the reformate stream from the plurality of catalyst-containing reformer tubes;
(b) reacting the reformate stream in the presence of a shift catalyst at a second temperature ranging from 190° C. to 500° C. and a second pressure ranging from 2 to 50 atmospheres to form a second process stream comprising carbon dioxide, hydrogen, carbon monoxide and methane;
(c) scrubbing the second process stream with a wash stream to form a carbon dioxide-depleted stream and a carbon dioxide-loaded wash stream;
(d) separating the carbon dioxide-depleted stream to form the hydrogen-containing product gas and a by-product gas comprising methane and carbon monoxide;
(e) introducing a portion of the by-product gas into the process stream at a location upstream of the plurality of catalyst-containing reformer tubes and/or into the reformate stream at a location upstream of a reforming catalyst in a secondary reforming reactor; and
(f) combusting a fuel gas comprising a portion of the hydrogen-containing product gas, optionally a portion of the by-product gas, and optionally a supplementary fuel in the reformer furnace external to the plurality of catalyst-containing reformer tubes to supply energy for reacting the process stream inside the plurality of catalyst-containing reformer tubes, and withdrawing a flue gas from the reformer furnace.

50% to 98% by volume of the by-product gas formed in step (d) may be introduced into the process stream in step (e).

The process may comprise reacting the process stream in the presence of a second reforming catalyst in an unfired reactor at a third temperature ranging from 425° C. to 600° C. and a third pressure ranging from 2 to 50 atmospheres to form carbon dioxide and hydrogen in the process stream prior to introducing the process stream into the plurality of catalyst containing reformer tubes. The portion of the by-product gas may be introduced into the process stream upstream of the unfired reactor. The process stream reacted in the unfired reactor may comprise a portion of the by-product gas.

The process may comprise:
introducing an oxygen-rich gas into the reformate stream after withdrawing the reformate stream from the plurality of catalyst-containing reformer tubes to partially oxidize the reformate stream; and
reacting the partially oxidized reformate stream in the presence of the reforming catalyst in the secondary reforming reactor under reaction conditions sufficient to form reaction products comprising carbon monoxide and hydrogen in the reformate stream before reacting the reformate stream in the presence of the shift catalyst.

The portion of the by-product gas may be introduced into the reformate stream at the location upstream of the secondary reforming reactor. The reformate stream may comprise at least a portion of the by-product gas.

The process may comprise:
introducing a feed gas comprising at least one hydrocarbon and optionally steam into the reformate stream after withdrawing the reformate stream from the plurality of catalyst-containing reformer tubes, the at least one hydrocarbon selected from the group consisting of methane, ethane, propane, butane, pentane, and hexane;
introducing an oxygen-rich gas into the reformate stream after withdrawing the reformate stream from the plurality of catalyst-containing reformer tubes to partially oxidize the reformate stream; and
reacting the partially oxidized reformate stream in the presence of the reforming catalyst in the secondary reforming reactor under reaction conditions sufficient to form reaction products comprising carbon monoxide and hydrogen in the reformate stream before reacting the reformate stream in the presence of the shift catalyst.

The process may further comprise reacting the second process stream in the presence of a second shift catalyst at a fourth temperature ranging from 190° C. to 300° C. and a fourth pressure ranging from 2 to 50 atmospheres to form carbon dioxide and hydrogen in the second process stream prior to the step of scrubbing the second process stream. The second shift catalyst may comprise copper.

The fuel gas may comprise 30 volume % to 98 volume % hydrogen-containing product gas and 2 volume % to 70 volume % by-product gas.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

As used herein, "plurality" means at least two.

For the purposes of simplicity and clarity, detailed descriptions of well-known devices, circuits, and methods are omitted so as not to obscure the description of the present invention with unnecessary detail.

The present invention relates to a process for producing a hydrogen-containing product gas. The process is particularly useful for producing a hydrogen-containing product gas with reduced carbon dioxide emissions compared to conventional steam/hydrocarbon reforming processes.

Figure 1:
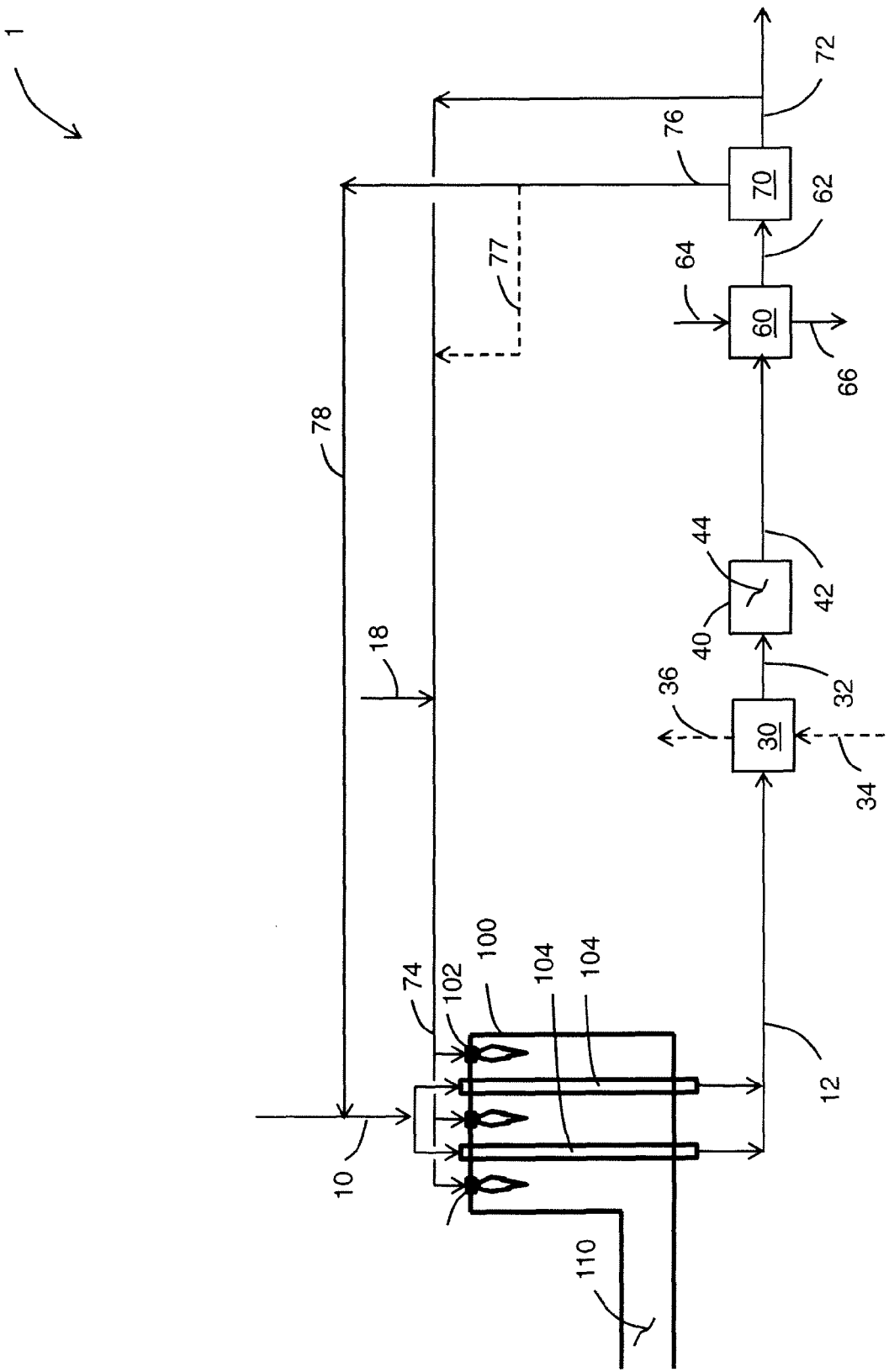
FIG. 1 is a process flow diagram for a process for producing a hydrogen-containing product gas with reduced carbon dioxide emissions.
Figure 2:
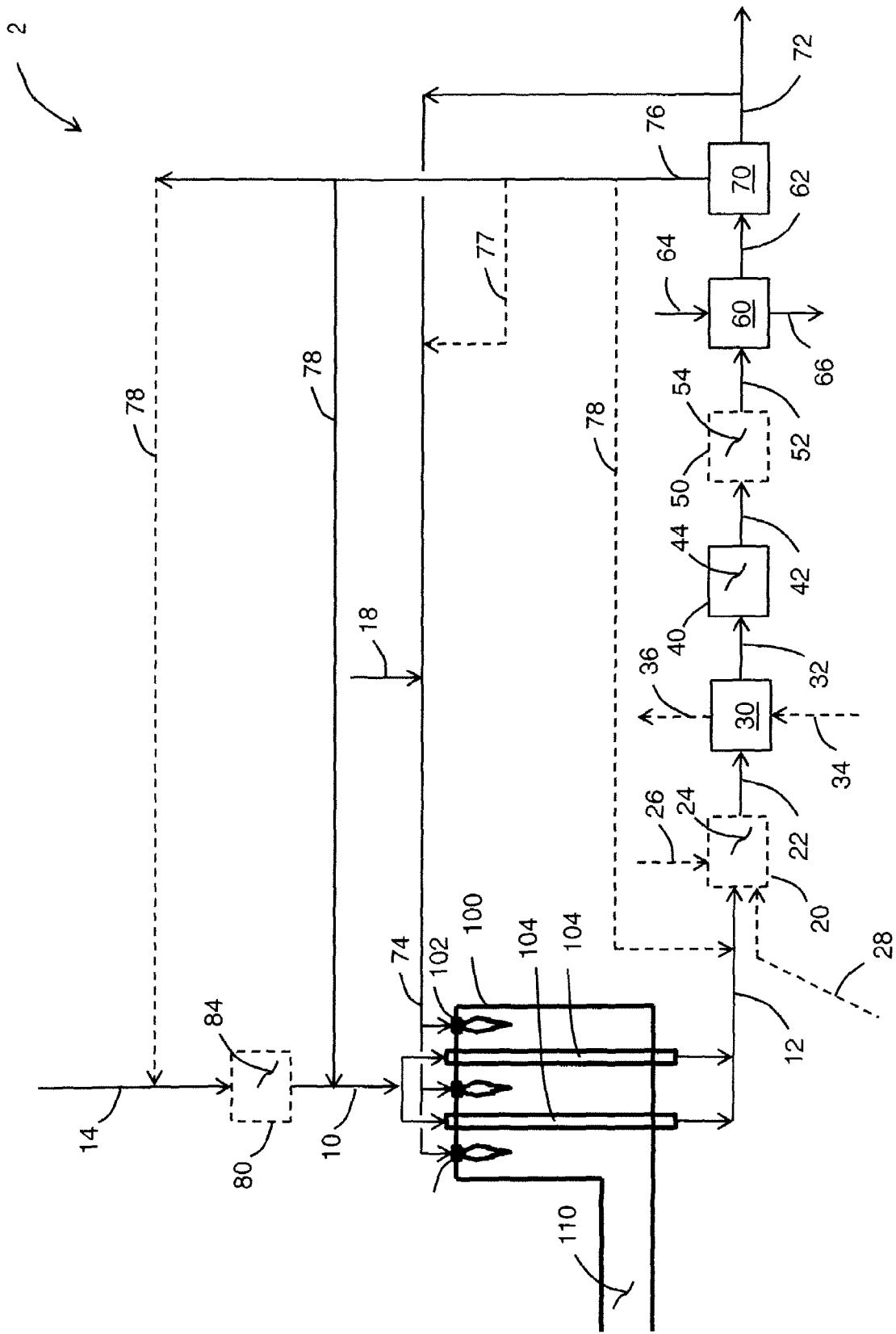
FIG. 2 is another process flow diagram for a process for producing a hydrogen-containing product gas with reduced carbon dioxide emissions.
Figure 3:
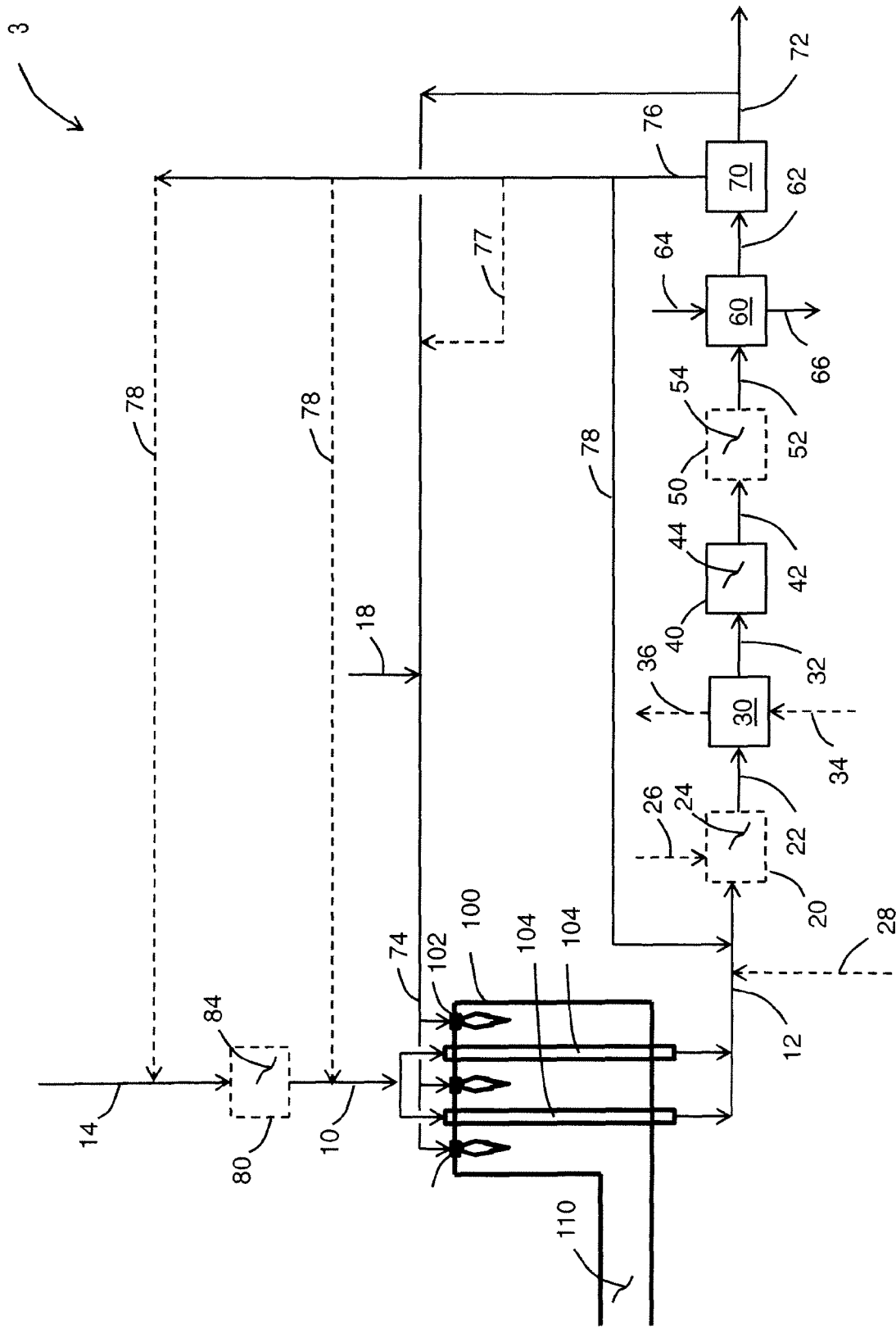
FIG. 3 is another process flow diagram for a process for producing a hydrogen-containing product gas with reduced carbon dioxide emissions.

With reference to FIGS. 1-3, the process comprises introducing a process stream 10 comprising steam and at least one hydrocarbon selected from the group consisting of methane, ethane, propane, butane, pentane, and hexane into a plurality of catalyst-containing reformer tubes 104 in a reformer furnace 100 and reacting the at least one hydrocarbon and steam inside the plurality of catalyst-containing reformer tubes 104 at a temperature ranging from 700° C. to 1000° C. and a pressure ranging from 2 to 50 atmospheres to form hydrogen and carbon monoxide in the process stream 10 and withdrawing a reformate stream 12 from the plurality of catalyst-containing reformer tubes 104.

As used herein, a reformate stream is any stream comprising hydrogen and carbon monoxide formed from the reforming reaction of a hydrocarbon and steam.

The process stream 10 may contain more than one hydrocarbon. The process stream may be initially formed from natural gas and steam, liquefied petroleum gas (LPG) and steam, naphtha and steam and/or other feedstocks known in the art. As described in more detail below, the process stream 10 may be processed in a prereformer prior to introducing the process stream 10 into the plurality of catalyst-containing reformer tubes 104.

Reformer furnaces with a plurality of catalyst-containing reformer tubes, i.e. tubular reformers, are well known in the art. Suitable materials and methods of construction are known. Catalyst in the catalyst-containing reformer tubes may be any suitable catalyst known in the art, for example, a supported catalyst comprising nickel.

The reformate stream 12 withdrawn from the plurality of catalyst-containing reformer tubes 104 is cooled in a heat exchanger 30 which may be a boiler to produce steam 36 from a water-containing stream 34 by indirect heat transfer and thereby remove heat from the reformate stream 12. Reformate stream 32 is withdrawn from the boiler 30. Reformate stream 12 may be passed to the heat exchanger 30 to remove heat from the reformate stream 12 and improve the thermal efficiency of the process.

The reformate stream is passed to shift reactor 40. The process further comprises reacting carbon monoxide and steam in the reformate stream 32 in the presence of a shift catalyst 44 at a temperature ranging from 190° C. to 500° C. and a pressure ranging from 2 to 50 atmospheres to form a second process stream 42 comprising carbon dioxide, hydrogen, carbon monoxide and methane.

Shift reactors and suitable shift catalysts are known in the art. The shift catalyst may be an iron-based high temperature shift catalyst, or a copper-based medium temperature shift catalyst, or a copper-based low temperature shift catalyst. Any suitable shift catalyst may be used. One skilled in the art can readily select a suitable shift catalyst.

The shift catalyst 44 may comprise iron oxide and the reaction temperature may be from 310° C. to 500° C. or 310° C. to 400° C.

The shift catalyst 44 may comprise copper and the reaction temperature may be from 200° C. to 400° C. or 200° C. to 350° C.

The process further comprises scrubbing the second process stream 42 with a wash stream 64 to form a carbon dioxide-depleted stream 62 and a carbon dioxide-loaded wash stream 66. Scrubbing may be done in a so-called gas scrubber 60. Carbon dioxide scrubbing is also known in the art as acid gas removal. The wash stream 64 may be any scrubbing fluid known in the art, for example N-methyl diethanolamine (aMDEA). Other scrubbing fluids associated with other scrubbing methods, for example, Rectisol®, Selexol®, Genosorb®, and sulfinol are known in the art.

The term "depleted" means having a lesser mole % concentration of the indicated component than the original stream from which it was formed. This means that carbon dioxide-depleted stream has a lesser mole % concentration of carbon dioxide than the second process stream which was introduced into the scrubber 60. The wash stream, having an affinity for carbon dioxide will become "loaded" with carbon dioxide. Carbon dioxide will become absorbed or otherwise taken in by the wash stream 64.

The carbon dioxide-depleted stream 62 contains only a small amount of carbon dioxide.

Water may also be removed from the second process stream 42 prior to the gas scrubber 60 and/or in the gas scrubber 60.

The process further comprises separating the carbon dioxide-depleted stream 62 in a separator 70 to form the hydrogen-containing product gas 72 and a by-product gas 76 comprising methane and carbon monoxide. The step of separating the carbon dioxide-depleted stream may be done by pressure swing adsorption and/or temperature swing adsorption. The separator 70 may be a pressure swing adsorber and/or temperature swing adsorber. Construction and operation of pressure swing adsorbers and temperature swing adsorbers are known in the art. Suitable devices and operating conditions may be selected by one skilled in the art.

Simpler and less efficient pressure swing adsorbers and/or temperature swing adsorbers and their associated processes may be used since a portion of the hydrogen-containing product gas 72 may be blended with the by-product gas 76 for use as a fuel in the reformer furnace (described below).

More water may be removed from the carbon dioxide-depleted stream 62 prior to separating the carbon dioxide-depleted stream. Water removal is conventional and water may be removed by any suitable method and suitable water removal device known in the art.

With reference to FIGS. 1-3, the process further comprises introducing a portion 78 of the by-product gas 76 into the process stream 10, 14 at a location upstream of the plurality of catalyst-containing reformer tubes 104 and/or into the reformate stream 12 at a location upstream of a reforming catalyst in a secondary reforming reactor 20 (described later). The portion 78 of the by-product gas 76 may be introduced into the process stream at one or more locations in the process. The portion 78 of the by-product gas 76 may be introduced into the process stream 10, 14 at a location upstream of the plurality of catalyst-containing reformer tubes 104. The portion 78 of the by-product gas 76 may be introduced into the reformate stream 12 at a location upstream of a reforming catalyst in a secondary reforming reactor 20. The portion 78 of the by-product gas 76 may be introduced into the process stream 10, 14 at a location upstream of the plurality of catalyst-containing reformer tubes 104 and introduced into the reformate stream 12 at a location upstream of a reforming catalyst in a secondary reforming reactor 20.

The portion 78 of the by-product gas 76 may be a divided portion of the by-product stream 76 formed from the separation of the carbon dioxide-depleted stream 62 and thereby have the same composition as the by-product stream 76 formed from the separation of the carbon dioxide-depleted stream 62. As used herein a "divided portion" of a stream is a portion having the same chemical composition as the stream from which it was taken.

By introducing the by-product gas back into the process stream for further processing, additional carbon in the stream may be converted to carbon dioxide and removed via the scrubbing step. Any by-product gas from the separator that is recycled back to the process feed stream reduces the $CO_2$ emitted from the overall hydrogen production process.

50% to 98% by volume of the by-product gas 76 formed by the separation of the carbon dioxide-depleted stream 62 in separator 70 may be introduced into the process stream 10, 12, and/or 14. The amount of $CO_2$ emitted from the hydrogen production process can be effectively reduced by increasing the amount of by-product gas that is recycled back to process feed stream.

The process further comprises combusting a fuel gas 74 comprising a portion of the hydrogen-containing product gas 72, optionally a portion 77 of the by-product gas 76, and optionally a supplementary fuel 18 in the reformer furnace 100 external to the plurality of catalyst-containing reformer tubes 104 to supply energy for reacting methane and steam inside the plurality of catalyst-containing reformer tubes 104. Flue gas 110 is withdrawn from the reformer furnace 100, and because the fuel gas 74 comprises hydrogen in an amount greater than conventional reformer furnaces, the flue gas will contain a reduced amount of carbon dioxide compared to conventional reformer furnaces. The supplementary fuel 18 is often called a trim fuel and may be, for example, natural gas. The portion of the hydrogen-containing product gas 72 and the portion of the by-product gas 76 may be divided portions of the respective gases.

The amount of carbon dioxide emissions in the flue gas 110 can be adjusted by the amount of hydrogen-containing product gas 72, the amount of by-product gas 76 and the amount of supplementary fuel 18 that are used as fuel.

For the case where most of the by-product gas 76 is recycled to the process stream and the fuel gas 74 consists essentially of the hydrogen-containing product gas 72, the carbon dioxide emissions in the flue gas 110 will be substantially reduced. The fuel gas may comprise 90 volume % to about 98 volume % hydrogen-containing product gas 72. For practical purposes, at least a portion of the by-product gas 76 may be used as fuel 74 to prevent the build up of inert gases (e.g. $N_2$ and Ar) in the process streams. Alternatively, and less desirably, a portion of the by-product gas 76 may be used in another process and/or disposed.

FIG. 2 and FIG. 3 show additional optional features, for example a so-called preformer 80, an oxygen secondary reformer 20, and a second shift reactor 50.

A prereformer is defined herein as any unfired vessel that converts hydrocarbon feedstock by reaction with steam over a catalyst with or without heating. A prereformer may be an adiabatic fixed bed reactor. A prereformer may be a tubular reactor. A prereformer generally employs a different type of catalyst than a primary reformer, for example a high activity, high nickel content catalyst. Temperatures in a prereformer may be in the range of about 400° C. to about 600° C. Heat to a prereformer may be provided from exhaust gases from a reformer or other source, but is characterized by the lack of direct heating by a combustion flame. A prereformer and a reformer may be physically connected.

As shown in FIG. 2 and FIG. 3, prior to introducing the process stream 10 into the plurality of catalyst-containing reformer tubes 104, the process may further comprise introducing the process stream 14 comprising steam and at least one hydrocarbon selected from the group consisting of methane, ethane, propane, butane, pentane and hexane into reactor 80 and reacting the at least one hydrocarbon and steam in the process stream 14 in the presence of a reforming catalyst 84 in an unfired reactor (prereformer) at a temperature ranging from 400° C. to 600° C. and a pressure ranging from 2 to 50 atmospheres prior to introducing the process stream 10 comprising steam and at least one hydrocarbon selected from the group consisting of methane, ethane, propane, butane, pentane, and hexane into the plurality of catalyst containing reformer tubes 104.

As used herein, the "process stream" includes the stream comprising steam and at least one hydrocarbon upstream of the optional prereformer 80, if present, to the exit from the plurality of catalyst-containing reformer tubes 104, where it becomes the "reformate stream." In case the optional prereformer 80 is not present, the process stream includes the stream comprising steam and at least one hydrocarbon upstream of the inlet of the plurality of catalyst-containing reformer tubes 104 to the exit of the plurality of catalyst-containing reformer tubes.

The hydrocarbon composition may vary as process stream 10, 14 is reacted. For example, the at least one hydrocarbon may initially include propane and butane and after reacting in a prereformer, the at least one hydrocarbon in the process stream may be methane.

Reforming catalyst 84 may be any suitable reforming catalyst known in the art for so-called "prereforming." Prereforming is a term used to describe reforming before the main reforming step, for example in a fired reformer. Catalysts for prereforming are commercially available. Since the articles "a" and "the" mean one or more, more than one prereformer and more than one reforming catalyst may be used.

Reforming catalyst 84 may comprise at least one metal selected from a group consisting of nickel, cobalt, platinum, palladium, rhodium, ruthenium, iridium and mixtures thereof.

Reforming catalysts suitable for prereforming are discussed in U.S. Pat. Nos. 4,105,591, 3,882,636, 3,988,425, GB 969,637, GB 1,150,066, and GB 1,155,843.

Reforming catalyst 84 may be in a wide variety of shapes or forms, for example cylindrical pellets, Raschig rings, multi-hole shaped catalyst, etc. or other form known in the art. The catalyst size may range from about 1 mm to about 15 mm in diameter. The length of the catalyst may range from about 3 mm to 10 mm. The ideal size for a given application depends on a number of factors including the catalyst shape and nickel loading, the operating temperature, pressure, and feed composition, and the allowable pressure drop. A catalyst with a multi-hole shape with a diameter in the range from 5 mm to 25 mm and a height to diameter ratio of 0.5 to 1.2 will be suitable for reforming catalyst 102. One skilled in the art is able to select suitable catalyst with a suitable shape for reforming catalyst 84.

Reforming catalyst 84 may also be structured packing catalyst where the catalyst is applied as a washcoat on a structured packing. Structured packing is known in the art. As used herein, the term "structured packing" means a flow guide having a plurality of substantially parallel passages. Substantially parallel means parallel within manufacturing tolerances. Davidson, U.S. Pat. No. 4,340,501 describes a structure in a reactor vessel where the fluid is intermittently but controllably brought into contact with the vessel walls.

As shown in FIG. 2 and FIG. 3, a portion of by-product gas 76 may be recycled back to the reactor 80. Process stream 14 may comprise a portion of the by-product gas 76.

FIG. 2 and FIG. 3 also show an optional secondary reforming reactor 20 located in the process between the plurality of catalyst-containing tubes 104 and the shift reactor 40. The process may further comprise introducing an oxygen-rich gas 26 into the reformate stream 12 after withdrawing the reformate stream 12 from the plurality of catalyst-containing reformer tubes 104 to partially oxidize the reformate stream, and reacting the partially oxidized reformate stream 12 in the presence of a reforming catalyst 24 in the secondary reforming reactor 20 under reaction conditions sufficient to form reaction products comprising carbon monoxide and hydrogen in the reformate stream 22. The oxygen-rich gas 26 may be introduced into the reformate stream 12 before reactor 20 or may be introduced into the reformate stream 12 in reactor 20, for example through a burner.

Secondary reforming reactors are well-known in the art and used widely for the production of ammonia and methanol. Secondary reforming reactors are refractory lined vessels with one or more burners and a reforming catalyst bed. Heat required for the reforming reaction is provided by partial oxidation (combustion) of a portion of the feed.

Effluent from the primary reformer is fed to the secondary reforming reactor where it is mixed with oxygen fed through a burner. Partial oxidation reactions occur in a combustion zone proximate or just below the burner. The partially oxidized mixture then passes through a catalyst bed where the mixture is substantially thermodynamically equilibrated over the reforming catalyst.

U.S. Pat. No. 3,479,298, incorporated herein by reference, discloses a secondary reformer for the production of a hydrogen-containing gas, and discloses that if oxygen is used instead of air, the process gas leaving the secondary reformer is a gas suitable for further treatment to yield methanol or high purity hydrogen.

Tindall et al., "Alternative technologies to steam-methane reforming," *Hydrocarbon Processing*, pp. 75-82, November, 1995, also disclose a oxygen secondary reformer for producing hydrogen.

As used herein, an oxygen-rich gas is an oxygen-containing gas having an oxygen concentration of 98 volume % to 100 volume %, for example industrial grade oxygen. Oxygen is added in an amount for incomplete combustion of any hydrocarbons in the reformate stream. The resulting stream 22 is rich in hydrogen and carbon monoxide.

The reforming catalyst 24 may be any conventional gas feed type of steam reforming catalyst suitable for promoting the reaction of methane and steam to produce hydrogen. Typical suitable reforming catalysts include nickel catalysts such as nickel and/or nickel oxide supported on a carrier such as alumina. The nickel catalyst generally contains 8 to 30 weight percent nickel calculated as NiO and may additionally contain other metal or metal compound promoters. Suitable catalysts may be readily selected by one skilled in the art.

Reaction conditions sufficient to form reaction products in the secondary reforming reactor 20 include a temperature ranging from 800° C. to 1200° C., or 900° C. to 1100° C., and a pressure ranging from 2 to 50 atmospheres.

As shown in FIG. 2 and in FIG. 3, a portion 78 of the by-product gas 76 may be introduced into the process stream 10, 14 at a location upstream of the plurality of catalyst-containing reformer tubes 104 and/or into the reformate stream 12 at a location upstream of the secondary reforming reactor 20. The portion 78 of the by-product gas 76 may be introduced into one of the locations or subdivided and introduced into two or more locations. For example, the portion 78 of the by-product gas 76 may be introduced into the process stream 10 just upstream of the plurality of catalyst-containing reformer tubes 104. Alternatively, the portion 78 of the by-product gas 76 may be divided with a first portion introduced into the process steam 10 at a location upstream of the plurality of the catalyst-containing reformer tubes and a second portion of the by-product gas introduced into the reformate stream 12 upstream of the secondary reforming reactor 20. The reformate stream 12 may comprise at least a portion of the by-product gas 76.

Generally, not all of the by-product gas 76 will be recycled to the process stream and/or the reformate stream. Another portion 77 of the by-product stream may be introduced in the fuel gas stream 74 as shown in FIGS. 1-3. This other portion 77 may be required to purge the process of inert gases (e.g. $N_2$ and Ar).

As shown in FIG. 2 and FIG. 3, the process may comprise introducing a feed gas 28 into the reformate stream 12 after withdrawing the reformate stream 12 from the plurality of catalyst-containing reformer tubes 104. The feed gas 28 comprises at least one hydrocarbon and optionally steam. The at least one hydrocarbon is selected from the group consisting of methane, ethane, propane, butane, pentane, and hexane. Steam addition is optional in case a suitable amount of steam remains from the primary reformer. The process may further comprise introducing an oxygen-rich gas 26 into the reformate stream after withdrawing the reformate stream from the plurality of catalyst-containing reformer tubes to partially oxidize the reformate stream. The process may then comprise reacting the partially oxidized reformate stream in the presence of the reforming catalyst 24 in the secondary reforming reactor 20 under reaction conditions sufficient to form reaction products comprising carbon monoxide and hydrogen in the reformate stream 12.

The feed gas 28 may be introduced into the reformate stream 12 before the resultant mixture is introduced into the secondary reforming reactor 20. The feed gas 28 may be introduced into the reformate stream 12 in the secondary reactor 20. Typically, the oxygen-rich gas will be introduced into the secondary reactor 20 separately from the feed gas 28 and the reformate stream 12.

The hydrocarbon source for the feed gas 28 may be the same as the hydrocarbon source for the process stream 10, 14.

The benefit of providing a feed gas comprising at least one hydrocarbon and reacting the feed gas in the secondary reforming reactor 20 is that the size of the reformer furnace 100 and correspondingly, the plurality of catalyst-containing reformer tubes, will be smaller. One skilled in the art can suitably optimize the size of and amount of feedstock processed in the reformer furnace 100 and the secondary reforming reactor 20. Another benefit is that fuel requirements in the primary reformer are reduced.

As shown in FIG. 2 and in FIG. 3, the process may include a second shift reactor 50. The second process stream 42 withdrawn from the shift reactor 40 may be further shifted in the second shift reactor 50. The second process stream may be suitably cooled prior to being introduced into the second shift reactor 50. The process may then further comprise reacting carbon monoxide and steam in the second process stream 42 in the presence of shift catalyst 54 at a temperature ranging from 190° C. to 300° C. and a pressure ranging from 2 to 50 atmospheres to form carbon dioxide and hydrogen in the second process stream 52. Shift catalyst 54 may comprise copper. Suitable catalysts may be readily selected by one skilled in the art. This additional process step, if included, would be conducted prior to the step of scrubbing the second process stream 52.

This sequence of two shift reaction steps may be a high temperature shift followed by a low temperature shift. The high temperature shift is conducted using an iron-based shift catalyst at a temperature ranging from 310° C. to 500° C. or 310° to 400° C. The low temperature shift is conducted using a shift catalyst comprising copper and optionally zinc oxide at a temperature ranging from 190° C. to 300° C.

As used herein, the "second process stream" includes the stream comprising carbon dioxide, hydrogen, carbon monoxide and methane from the exit of the upstream shift reactor to the exit of the scrubber where a portion becomes the "carbon dioxide-depleted stream."

EXAMPLES

The present invention will be better understood with reference to the following examples, which are intended to illustrate, but not to limit the scope of the invention; the invention being defined by the claims.

All of the following examples were simulated using Aspen Plus®. The results are normalized for an output of hydrogen product from the hydrogen production process of 100,000 Nm³/h. The output of hydrogen product is the total hydrogen produced less any amount used for combustion in the reformer. The scrubbers 60 and 260 are assumed to be 100% effective in the removal of $CO_2$. Water is also removed in the scrubber.

The composition of the by-product gas 76, 276 is based on a pressure swing adsorber. A prereformer was not used in any of the examples.

Natural gas was assumed to be 98 mole % $CH_4$ and 2 mole % $N_2$.

Example 1

Figure 4:
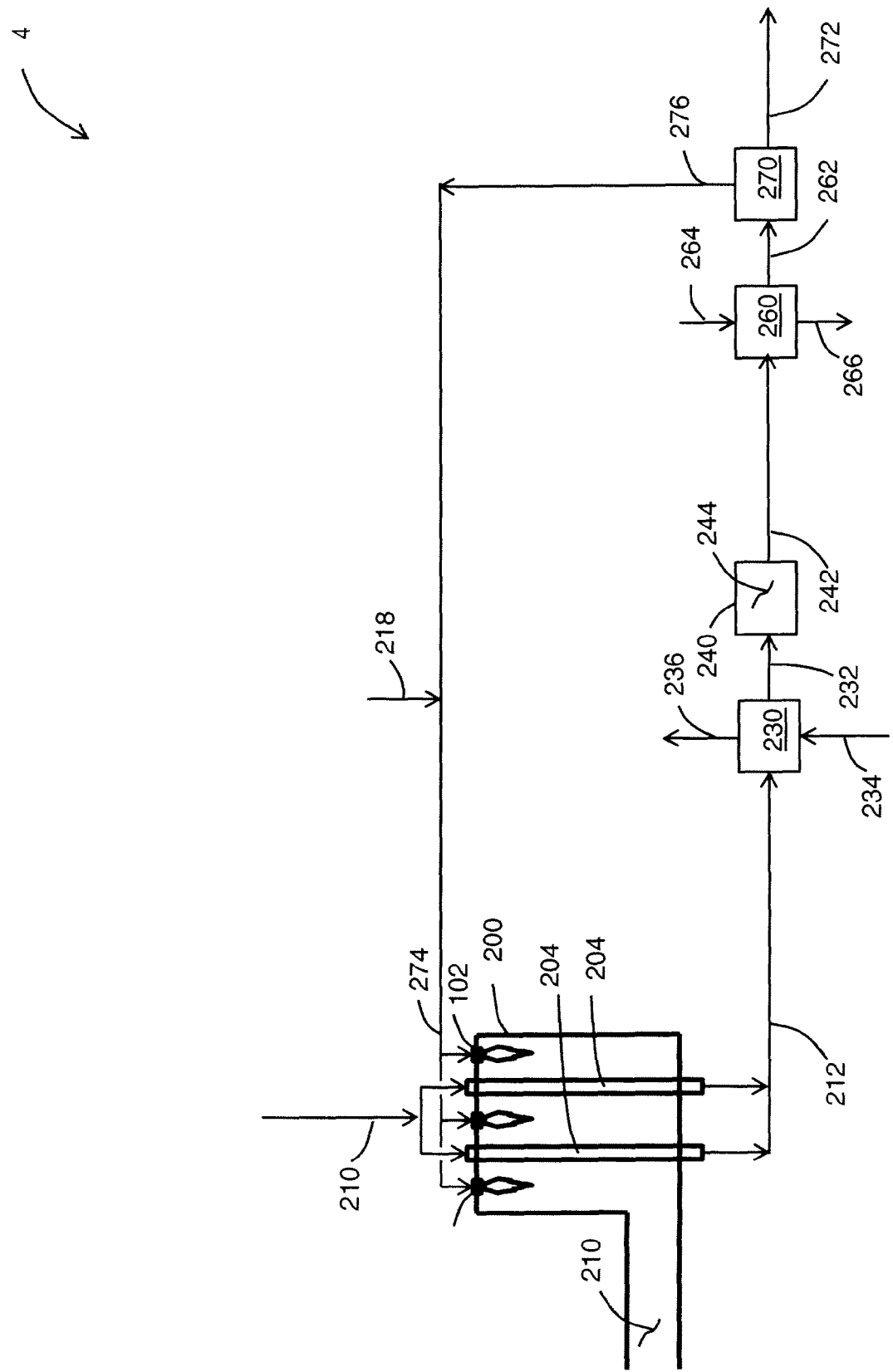
FIG. 4 is a process flow diagram for a prior art process for producing a hydrogen-containing product gas.

FIG. 4 illustrates a process flow diagram for a prior art hydrogen production process. A high temperature shift reactor 240 is used. Fuel for the reformer is provided by the by-product gas 276 and natural gas trim fuel. No hydrogen is used as fuel and none of the by-product gas is recycled back to the process stream. Results are summarized in Table 1.

$CO_2$ emissions of 16,167 Nm³/h were calculated for a hydrogen product output of 100,000 Nm³/h. Flue gas $CO_2$ is about 40% of the $CH_4$ feed. The balance of 60% is removed in the scrubber 260. For ease of comparison with other cases, the molar ratio of $CO_2$ emissions to the hydrogen product output (100 000 Nm³/h) is shown in Table 1. The $CO_2/H_2$ molar ratio for this base case is 0.162.

Example 2

Example 2 is based on the process flow diagram shown in FIG. 1. Fuel to fire the reformer 100 is provided by by-product gas 76 and hydrogen-containing product gas 72. The amount of by-product gas and hydrogen-containing gas depends on the amount of by-product gas recycled to the process stream. No natural gas trim fuel is used. A high temperature shift reactor 40 is used. Several cases are summarized in Table 2 representing various amounts of recycling of the by-product gas 76 back to the process stream 10 upstream of the plurality of catalyst-containing reformer tubes 104.

Table 2 shows the effect of by-product recycle on the molar ratio of $CO_2$ emissions to the hydrogen product output. With 98% of the by-product gas recycled, the $CO_2/H_2$ molar ratio is reduced to 0.013 compared to 0.162 for Example 1.

For this case, small amounts of by-product gas recycle do not appear to improve the molar ratio of $CO_2$ emissions to the hydrogen product output very much. However, with higher levels of by-product gas recycle and using hydrogen as the trim fuel, the $CO_2$ emissions can be reduced by an order of magnitude.

With 98% by-product gas recycle, the $N_2$ content of the recycle gas is 34 mole %. This represents a large amount of $N_2$ circulating in the process loop, and the compression power for the system will be increased as a result. The reformer duty also increases with the amount of recycle flow. With additional capital, this stream may be heat exchanged to create steam which will be produced with low $CO_2$ emissions. This is in contrast to fired boilers, which generate substantial $CO_2$ emissions.

TABLE 2

| Stream | No Recycle | 50% by-product gas recycle | 90% by-product gas recycle | 98% by-product gas recycle |
| --- | --- | --- | --- | --- |
| $H_2$-containing product gas used as fuel (Nm³/h) | 6 466 | 25 815 | 65 108 | 88 298 |
| $CO_2$ in flue gas (Nm³/h) | 15 081 | 12 000 | 5 112 | 1 302 |
| By-product gas recycled (Nm³/h) | 0 | 21 573 | 74 842 | 136 406 |
| By-product gas used as fuel (Nm³/h) | 30 661 | 21 571 | 8 315 | 2 784 |
| Reformer duty (kW) | 113 451 | 126 056 | 158 178 | 182 204 |
| $CO_2/H_2$ | 0.151 | 0.120 | 0.051 | 0.013 |
| Mole fraction $N_2$ in recycle | 0.027 | 0.039 | 0.109 | 0.343 |
| $CH_4$ feed (Nm³/h) | 40 499 | 42 187 | 45 353 | 47 883 |

TABLE 1

| Stream | No Recycle |
| --- | --- |
| $H_2$-containing product gas used as fuel (Nm³/h) | 0 |
| $CO_2$ in flue gas (Nm³/h) | 16 167 |
| By-product gas recycled (Nm³/h) | 0 |
| By-product gas used as fuel (Nm³/h) | 28 957 |
| Reformer duty (kW) | 106 658 |
| $CO_2/H_2$ | 0.162 |
| Mole fraction $N_2$ in recycle | 0.027 |
| $CH_4$ feed (Nm³/h) | 40 499 |

Example 3

Example 3 is based on the process flow diagram shown in FIG. 1 and is similar to example 2, except that a low temperature shift reactor is used along with the high temperature shift reactor. All of the trim fuel is provided by hydrogen-containing product gas.

Results are summarized in Table 3 for various amounts of recycling of the by-product gas back to the process stream upstream of the plurality of catalyst-containing reformer tubes 104.

TABLE 3

| Stream | No Recycle | 50% by-product gas recycle | 90% by-product gas recycle | 98% by-product gas recycle |
|---|---|---|---|---|
| $H_2$-containing product gas used as fuel ($Nm^3/h$) | 11 752 | 32 128 | 68 683 | 86 388 |
| $CO_2$ in flue gas ($Nm^3/h$) | 10 322 | 7 901 | 2 844 | 605 |
| By-product gas recycled ($Nm^3/h$) | 0 | 17 913 | 54 807 | 101 108 |
| By-product gas used as fuel ($Nm^3/h$) | 26 635 | 17 913 | 6 090 | 2 063 |
| Reformer duty (kW) | 114 489 | 128 316 | 157 495 | 175 840 |
| $CO_2/H_2$ | 0.103 | 0.079 | 0.028 | 0.006 |
| Mole fraction $N_2$ in recycle | 0.031 | 0.048 | 0.148 | 0.455 |
| $CH_4$ feed ($Nm^3/h$) | 41 314 | 42 561 | 45 200 | 47 055 |

The results show that use of a low temperature shift reactor is effective for reducing the amount of $CO_2$ emissions. Compared to example 2, the $CO_2$ emissions are lower for each respective amount of by-product gas recycle.

Table 3 shows the effect of by-product recycle on the molar ratio of $CO_2$ emissions to the hydrogen product output. With 98% of the by-product gas recycled, the $CO_2/H_2$ molar ratio is reduced to 0.006, which is substantially lower than example 1 where the $CO_2/H_2$ molar ratio was 0.162.

In general, there is greater $CO_2$ recovery, less $CO_2$ emissions, lower reformer duty and smaller volumes of recycled gas compared to respective by-product gas recycle percentages in Example 2.

Example 4

Example 4 is based on the process flow diagram shown in FIG. 2 and is similar to Example 3, except that an oxygen secondary reformer is used. The oxygen for the oxygen secondary reformer 20 is assumed to by 99 vol. % $O_2$ and 1 vol. % Ar. All of the trim fuel is provided by hydrogen-containing product gas.

Results are summarized in Table 4 for various amounts of recycling of the by-product gas back to the process stream upstream of the plurality of catalyst-containing reformer tubes 104.

Table 4 shows the effect of by-product recycle on the molar ratio of $CO_2$ emissions to the hydrogen product output. With 98% of the by-product gas recycled, the $CO_2/H_2$ molar ratio is reduced to 0.0003, which is substantially lower than example 1 where the $CO_2/H_2$ molar ratio was 0.162.

With the oxygen secondary reformer, the methane slip is very low and even without a recycle stream, the $CO_2$ emission is nearly as low as in Example 2 with 98% by-product gas recycle.

This configuration has low reformer duty and low methane feed requirements, but has an oxygen requirement.

In general, there is greater $CO_2$ recovery, less $CO_2$ emissions, lower reformer duty and smaller volumes of recycled gas compared to respective by-product gas recycle percentages in Examples 2 and 3.

TABLE 4

| Stream | No Recycle | 50% by-product gas recycle | 90% by-product gas recycle | 98% by-product gas recycle |
|---|---|---|---|---|
| $H_2$-containing product gas used as fuel ($Nm^3/h$) | 23 200 | 31 441 | 39 960 | 47 078 |
| $CO_2$ in flue gas ($Nm^3/h$) | 1 524 | 832 | 176 | 32 |
| By-product gas recycled ($Nm^3/h$) | 0 | 10 921 | 28 101 | 72 796 |
| By-product gas used as fuel ($Nm^3/h$) | 19 557 | 10 922 | 3 123 | 1 485 |
| Reformer duty (kW) | 84 338 | 82 812 | 83 439 | 94 070 |
| $CO_2/H_2$ | 0.015 | 0.008 | 0.002 | 0.0003 |
| Mole fraction $N_2$ in recycle | 0.043 | 0.078 | 0.274 | 0.597 |
| Mole fraction Ar in recycle | 0.007 | 0.013 | 0.048 | 0.106 |
| $O_2$ requirement ($Nm^3/h$) | 13 261 | 14 118 | 14 984 | 15 702 |
| $CH_4$ feed ($Nm^3/h$) | 42 166 | 42 366 | 42 838 | 44 518 |

Example 5

Example 5 is based on the process flow diagram shown in FIG. 3 and is similar to Example 4, except that the by-product gas is recycled to the oxygen secondary reformer instead recycling to the primary reformer 100. The oxygen for the oxygen secondary reformer 20 is assumed to by 99 vol. % $O_2$ and 1 vol. % Ar. All of the trim fuel is provided by hydrogen-containing product gas.

Results are summarized in Table 5 for various amounts of recycling of the by-product gas back to the process stream downstream of the plurality of catalyst-containing reformer tubes 104 and upstream of the oxygen secondary reformer 20.

Table 5 shows the effect of by-product recycle on the molar ratio of $CO_2$ emissions to the hydrogen product output. With 98% of the by-product gas 76 recycled, the $CO_2/H_2$ molar ratio is reduced to 0.0003, which is substantially lower than Example 1 where the $CO_2/H_2$ molar ratio was 0.162. The results are not much different than that of Example 4, except that the oxygen requirement is higher and the natural gas feed is higher. With proper integration of a heat exchanger, more steam may be generated. This steam will be produced with very low $CO_2$ emissions compared to a fired boiler.

With the oxygen secondary reformer, the methane slip is very low and even without a recycle stream, the $CO_2$ emission is nearly as low as in Example 2 with 98% by-product gas recycle.

In general, there is greater $CO_2$ recovery, less $CO_2$ emissions, lower reformer duty and smaller volumes of recycled gas compared to respective by-product gas recycle percentages in Examples 2 and 3.

TABLE 5

| Stream | No Recycle | 50% by-product gas recycle | 90% by-product gas recycle | 98% by-product gas recycle |
|---|---|---|---|---|
| $H_2$-containing product gas used as fuel ($Nm^3/h$) | 23 200 | 32 779 | 42 082 | 46 471 |
| $CO_2$ in flue gas ($Nm^3/h$) | 1 524 | 838 | 173 | 27 |
| By-product gas recycled ($Nm^3/h$) | 0 | 11 031 | 28 611 | 76 310 |
| By-product gas used as fuel ($Nm^3/h$) | 19 557 | 11 032 | 3 179 | 1 557 |
| Reformer duty (kW) | 84 338 | 85 669 | 87 695 | 92 817 |
| $CO_2/H_2$ | 0.015 | 0.008 | 0.002 | 0.0003 |
| Mole fraction $N_2$ in recycle | 0.043 | 0.078 | 0.276 | 0.593 |
| Mole fraction Ar in recycle | 0.007 | 0.013 | 0.05 | 0.127 |
| $O_2$ requirement ($Nm^3/h$) | 13 261 | 14 333 | 15 935 | 19 805 |
| $CH_4$ feed ($Nm^3/h$) | 42 166 | 42 832 | 43 845 | 46 406 |

Although the present invention has been described as to specific embodiments or examples, it is not limited thereto, but may be changed or modified into any of various other forms without departing from the scope of the invention as defined in the accompanying claims.

We claim:

1. A process for producing a hydrogen-containing product gas, comprising:
   (a) introducing a process stream comprising steam and at least one hydrocarbon selected from the group consisting of methane, ethane, propane, butane, pentane, and hexane into a plurality of catalyst-containing reformer tubes in a reformer furnace and reacting the process stream inside the plurality of catalyst-containing reformer tubes at a first temperature ranging from 700° C. to 1000° C. and a first pressure ranging from 2 to 50 atmospheres to form a reformate stream comprising hydrogen, carbon monoxide, methane and steam and withdrawing the reformate stream from the plurality of catalyst-containing reformer tubes;
   (b) reacting the reformate stream in the presence of a shift catalyst at a second temperature ranging from 190° C. to 500° C. and a second pressure ranging from 2 to 50 atmospheres to form a second process stream comprising carbon dioxide, hydrogen, carbon monoxide and methane;
   (c) scrubbing the second process stream with a wash stream to form a carbon dioxide-depleted stream and a carbon dioxide-loaded wash stream;
   (d) separating the carbon dioxide-depleted stream to form the hydrogen-containing product gas and a by-product gas comprising methane and carbon monoxide;
   (e) introducing a portion of the by-product gas into the process stream at a location upstream of the plurality of catalyst-containing reformer tubes and/or into the reformate stream at a location upstream of a reforming catalyst in a secondary reforming reactor; and
   (f) combusting a fuel gas comprising a portion of the hydrogen-containing product gas, optionally a portion of the by-product gas, and optionally a supplementary fuel in the reformer furnace external to the plurality of catalyst-containing reformer tubes to supply energy for reacting the process stream inside the plurality of catalyst-containing reformer tubes, and withdrawing a flue gas from the reformer furnace.

2. The process of claim 1 wherein 50% to 98% by volume of the by-product gas formed in step (d) is introduced into the process stream in step (e).

3. The process of claim 1 further comprising:
   reacting the process stream in the presence of a second reforming catalyst in an unfired reactor at a third temperature ranging from 425° C. to 600° C. and a third pressure ranging from 2 to 50 atmospheres to form carbon dioxide and hydrogen in the process stream prior to introducing the process stream into the plurality of catalyst containing reformer tubes.

4. The process of claim 3 wherein the portion of the by-product gas is introduced into the process stream upstream of the unfired reactor.

5. The process of claim 1 further comprising:
   introducing an oxygen-rich gas into the reformate stream after withdrawing the reformate stream from the plurality of catalyst-containing reformer tubes to partially oxidize the reformate stream; and
   reacting the partially oxidized reformate stream in the presence of the reforming catalyst in the secondary reforming reactor under reaction conditions sufficient to form reaction products comprising carbon monoxide and hydrogen in the reformate stream before reacting the reformate stream in the presence of the shift catalyst.

6. The process of claim 5 wherein the portion of the by-product gas is introduced into the reformate stream at the location upstream of the secondary reforming reactor.

7. The process of claim 1 further comprising:
   introducing a feed gas comprising at least one hydrocarbon and optionally steam into the reformate stream after withdrawing the reformate stream from the plurality of catalyst-containing reformer tubes, the at least one hydrocarbon selected from the group consisting of methane, ethane, propane, butane, pentane, and hexane;
   introducing an oxygen-rich gas into the reformate stream after withdrawing the reformate stream from the plurality of catalyst-containing reformer tubes to partially oxidize the reformate stream; and
   reacting the partially oxidized reformate stream in the presence of the reforming catalyst in the secondary reforming reactor under reaction conditions sufficient to form reaction products comprising carbon monoxide and hydrogen in the reformate stream before reacting the reformate stream in the presence of the shift catalyst.

8. The process of claim 1 wherein the shift catalyst comprises iron oxide and the second temperature ranges from 310° C. to 500° C.

9. The process of claim 1 wherein the shift catalyst comprises copper and the second temperature ranges from 200° C. to 400° C.

10. The process of claim 8 further comprising:

reacting the second process stream in the presence of a second shift catalyst at a fourth temperature ranging from 190° C. to 300° C. and a fourth pressure ranging from 2 to 50 atmospheres to form carbon dioxide and hydrogen in the second process stream prior to the step of scrubbing the second process stream.

11. The process of claim 10 wherein the second shift catalyst comprises copper.

12. The process of claim 1 wherein the fuel gas comprises 30 volume % to 98 volume % hydrogen-containing product gas and 2 volume % to 70 volume % by-product gas.

* * * * *